Figure 3:
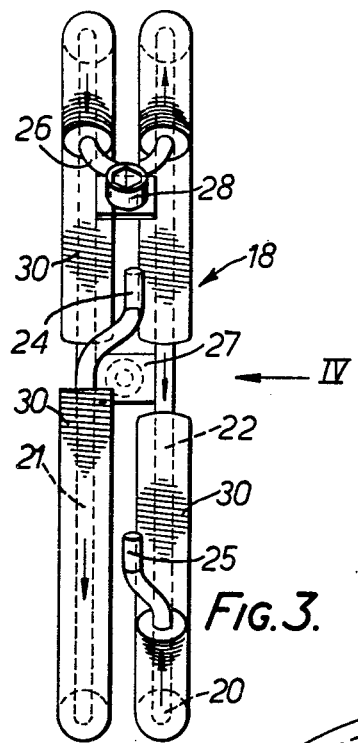

United States Patent [19]

Bourne

[11] 4,198,819
[45] Apr. 22, 1980

[54] POWER TRANSMISSION

[75] Inventor: Nigel G. Bourne, Droitwich, England

[73] Assignee: Dowty Meco Limited, Worcester, England

[21] Appl. No.: 915,294

[22] Filed: Jun. 13, 1978

[30] Foreign Application Priority Data

Jun. 14, 1977 [GB] United Kingdom ............... 24683/77
Feb. 18, 1978 [GB] United Kingdom ................. 6533/78

[51] Int. Cl.² ............................................ F16D 33/00
[52] U.S. Cl. ...................................... 60/337; 60/456; 60/DIG. 5; 74/606 A
[58] Field of Search .................. 60/337, 456, DIG. 5; 74/606 A; 310/64, 53

[56] References Cited

U.S. PATENT DOCUMENTS

| 2,897,382 | 7/1959 | Hamill | 310/64 |
| 3,090,195 | 5/1963 | Fisher et al. | 60/337 X |
| 3,362,162 | 1/1968 | Willmer | 60/337 |

FOREIGN PATENT DOCUMENTS 582218 11/1946 United Kingdom ...................... 60/337

Primary Examiner—Edgar W. Geoghegan
Attorney, Agent, or Firm—Young & Thompson

[57] ABSTRACT

A power transmission including a motor, a "fixed-fill" fluid coupling and a gear box, at least the "fixed-fill" fluid coupling of which is liquid cooled.

13 Claims, 6 Drawing Figures

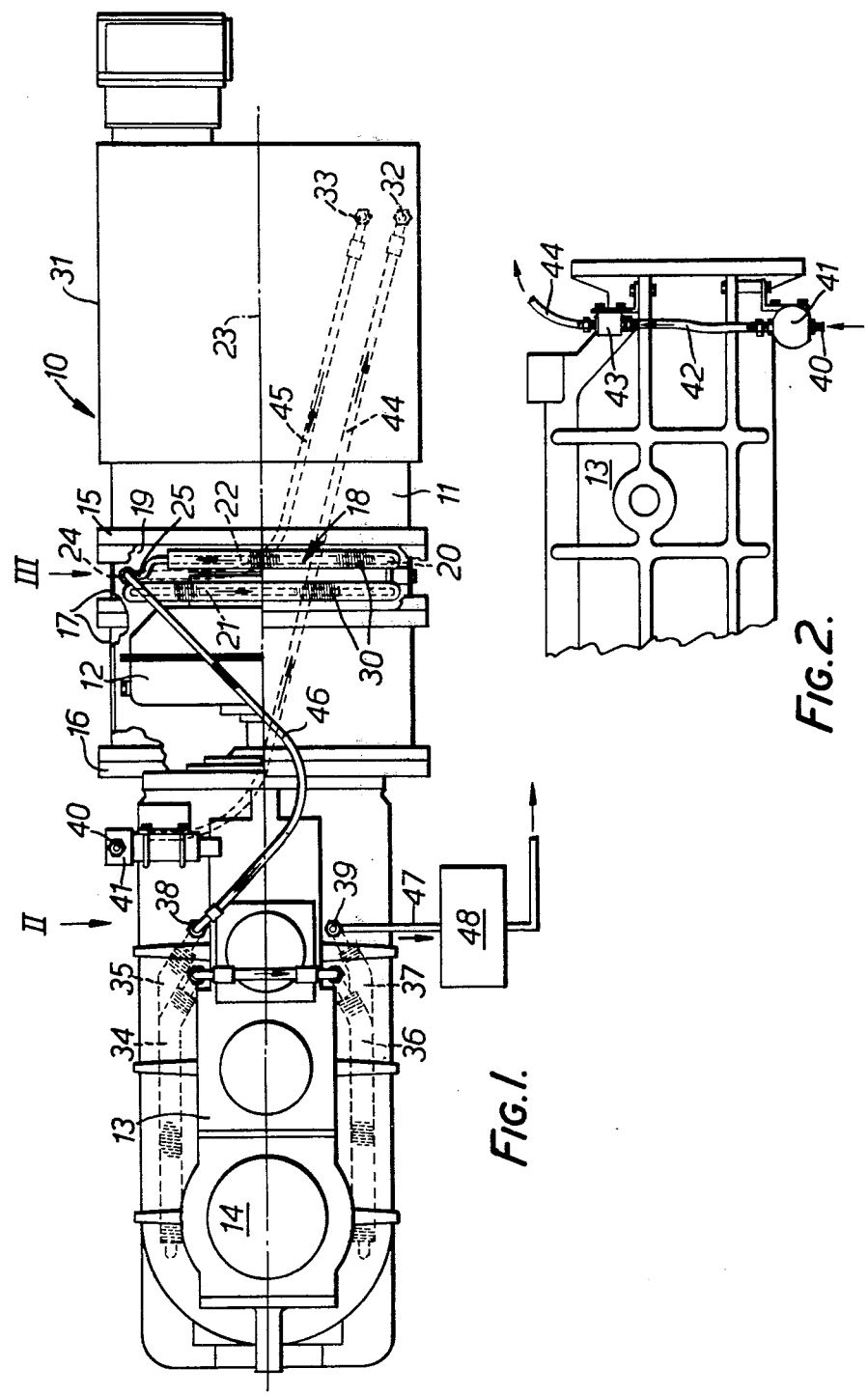

POWER TRANSMISSION

This invention relates to a power transmission.

According to the invention, a power transmission includes a motor, a "fixed-fill" fluid coupling, and a gear box, at least the "fixed-fill" fluid coupling of which is liquid cooled.

Preferably, all three of the components of the transmission are liquid cooled. It may be arranged for the liquid used for cooling said three components to flow thereto in a desired sequence: for example, the liquid may first flow to, and cool, the motor, it may then flow from the motor to, and cool, the fluid coupling and it may then flow from the fluid coupling to, and cool, the gear box.

Having so flowed to the three components, the liquid may then be passed through a heat-exchange device, which cools the liquid, and then be recirculated to the first of the components to be cooled in the sequence. Alternatively, the liquid, having flowed to said three components one after the other in the sequence, may than be used for another purpose, or, where the liquid supply is plentiful, be allowed to run to waste.

The motor may be an electric motor.

The power transmission may be one which is intended for driving the chain or chains of an armoured face conveyor in a coal mine.

It may be arranged for the cooling liquid to flow through a jacket associated with the motor.

Further, it may be arranged for the cooling liquid to flow through a jacket associated with the fluid coupling.

Alternatively it may be arranged for the cooling liquid to flow through the interior of tubing formed as a framework and so associated with the fluid coupling as to be in heat-exchange relation with respect thereto.

The framework of tubing may comprise a single tube which is so shaped as to form at least two-axially-spaced-apart portions which are substantially of ring-shape. In this case one end portion of said tube may form a liquid inlet and the other end portion of the tube may form a liquid outlet, the tube being so shaped at a suitable portion or portions thereof as at least to assist in affording the axial spacing of said substantially ring-shaped portions.

The external surface of the single tube may carry cooling fins. These fins may be spirally wound, or, alternatively may be of parrallel, radial, form.

Instead of comprising a single tube, said framework may include at least two ring members, formed of tubing, whose centres lie on the longitudinal axis of the fluid coupling, or substantially so.

The ring members may be axially spaced apart and connected together by a plurality of joining tubes. The joining tubes may be closely-spaced circumferentially of the ring members, and their interiors open into the interiors of the ring members.

The joining tubes may be so shaped and so joined to said ring members that each joining tube projects inwardly from one of said ring members towards said fluid coupling for part of its length and for the remainder of its length is directed away from said coupling to join with the adjacent ring member.

Preferably said joining tubes are curved in shape and are substantially radially-disposed with respect to said longitudinal axis. Alternate joining tubes may project further towards said fluid coupling than the other joining tubes.

A guard member may be provided around the fluid coupling and spaced therefrom, said framework then being disposed in the space formed between the guard member and the fluid coupling.

The jacket associated with the fluid coupling may be comprised by the outer surface of a housing within which the fluid coupling is contained, a flange at each end of the housing, fins which radiate outwardly of said outer surface and extend between the two flanges, and a cover plate or cover plates associated with the flanges and fins. Thus, a plurality of spaces will be provided about the fluid coupling through which the cooling liquid can be passed.

It may be arranged for said cooling liquid to flow through a finned tube or tubes associated with the gear box.

The term "fixed-fill" fluid coupling used throughout this specification and claims is intended to means a fluid coupling which contains a predetermined quantity of liquid and which has no means whereby further liquid can be supplied to the coupling while it is running.

Figure 4:
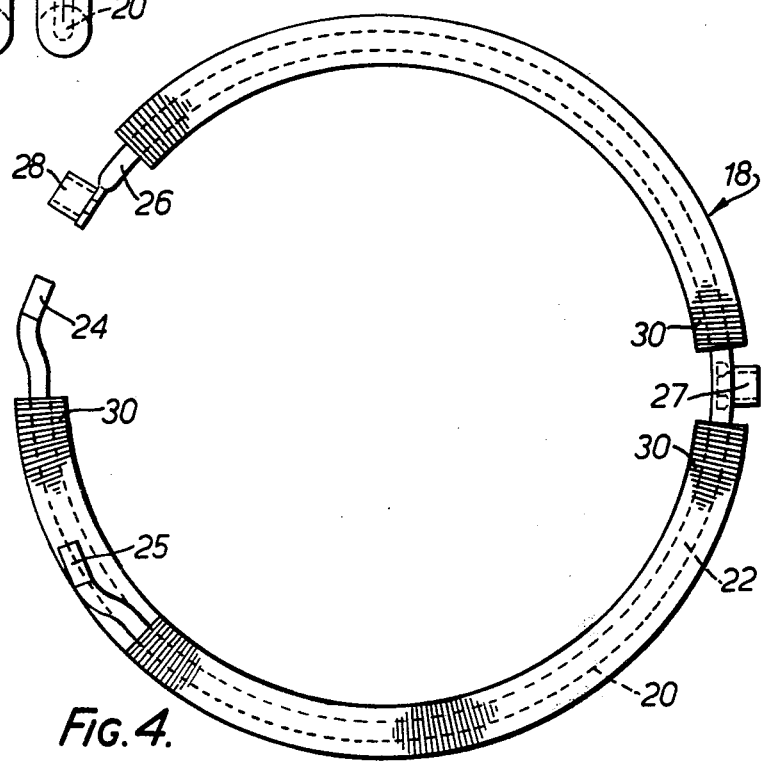
Figure 6:
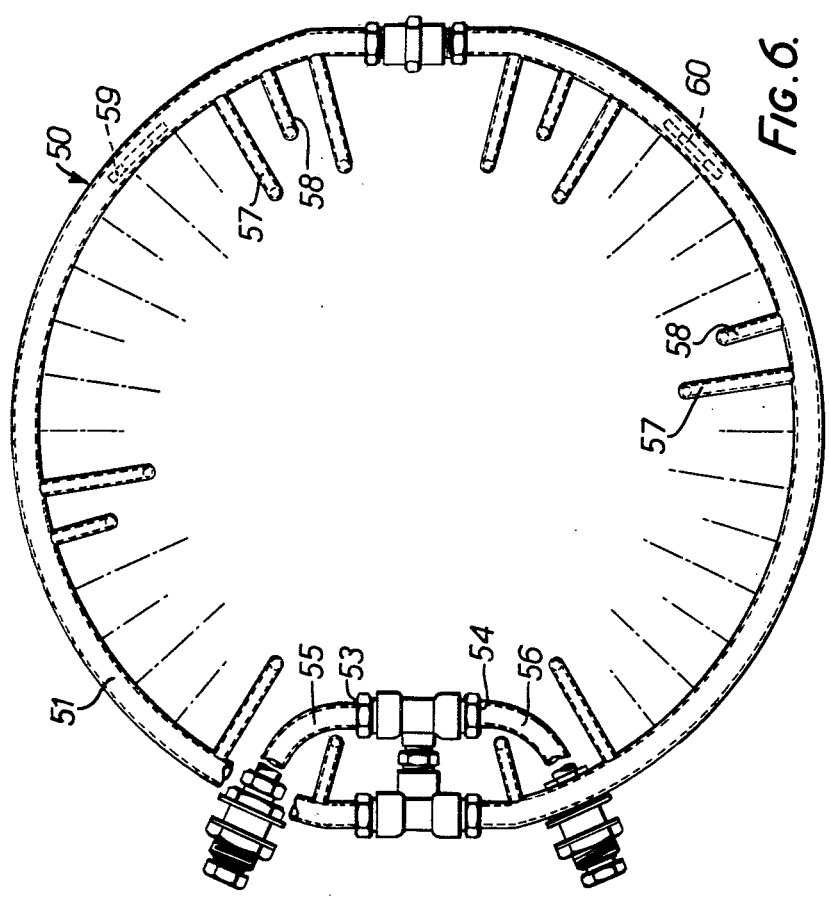
Figure 5:
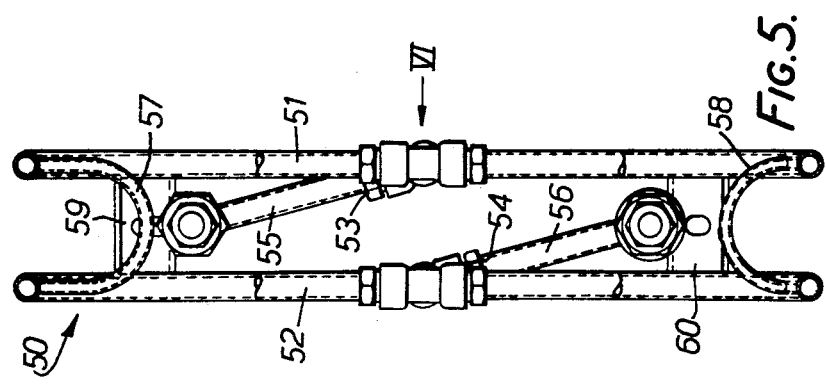

Two embodiments of the invention will now be described by way of example with reference to the accompanying drawings, of which, FIG. 1 is a partly cut-away elevation of a power transmission in accordance with the first embodiment, FIG. 2 is a scrap view taken in the direction of the arrow II on FIG. 1, FIG. 3 is an enlarged view, taken in the direction of the arrow III on FIG. 1, of the framework of tubing shown in association with the fluid coupling in that figure, FIG. 4 is a view taken in the direction of the arrow IV on FIG. 3, FIG. 5 is a part-sectional elevation of a framework of tubing, forming an alternative to that of FIGS. 3 and 4, in accordance with the second embodiment, and, FIG. 6 is a view taken in the direction of the arrow VI on FIG. 5.

Referring to FIGS. 1 to 4 of the drawings, a power transmission 10, suitable for driving the chain or chains (not shown) of an armoured face conveyor in a coal mine, includes an electric motor 11, a "fixed-fill" fluid coupling 12 (as hereinbefore defined), and a gear box 13 having an output shaft 14. In operation the electric motor drives the gear box, and thus the chain or chains of the conveyor, by way of the fluid coupling.

The power transmission includes a motor flange 15 upon which the motor 11 is fitted and a gear box flange 16 upon which the gear box 13 is fitted. The fluid coupling 12 is positioned between these two flanges and a two-part coupling guard member 17 of cylindrical shape is secured between the two flanges in a manner such that it surrounds and is spaced from the fluid coupling.

A framework 18 of tubing is provided in the annular space 19 formed between the motor flange 15, the member 17 and the right-hand end portion of the fluid coupling 12. This framework comprises a single tube 20 which is so shaped as to form two axially-spaced-apart portions 21 and 22 which are substantially of ring-shape with their centres lying on the longitudinal axis 23 of the fluid coupling. The end portions of the single tube comprise short pieces, 24 and 25, of steel tube which are brazed to the main portion of the tube which is of copper.

The end portion 24 forms a water inlet for the framework 18 and the end portion 25 forms a water outlet therefor, both portions being associated with apertures in the guard member 17 through which said end portions are connected to pipes later described.

The single tube 20 is so curved through 180 degrees at a suitable portion, as at 26 in FIGS. 3 and 4, around the circumference of the framework as to assist in affording the axial spacing of the portions 21 and 22.

Two attachment members, 27 and 28, for securing the framework 18 in position, are brazed to the tube 20. One of these members, 27, serves also to assist in affording the axial spacing of the portions 21 and 22. The second member 28 is brazed to the portion of the tube curved through 180 degrees at 26.

The external surfaces of the portions 21 and 22 are provided as shown with spirally-wound fins 30, also of copper and brazed thereto.

The casing of the electric motor 11 is provided with a cylindrical water jacket 31 having a water inlet 32 and a water outlet 33. The gear box is provided with a number of interconnected finned cooling tubes 34, 35, 35 and 37 disposed in the manner shown in FIG. 1. These tubes have a common water inlet 38 and a common water outlet 39.

In this embodiment the desired sequence of water-cooling of the three components of the power transmission is:- (i) the electric motor 11, (ii) the fluid coupling 12, and, (iii) the gear box 13. The inlet for the cooling circuit is shown at 40 in FIGS. 1 and 2, and a pressure reducing valve 41 is disposed adjacent the inlet as shown. A pipe 42 is taken from the inlet and reducing valve to a pressure relief valve 43. A further pipe 44 is taken from the relief valve to the inlet 32 of the jacket 31 of the electric motor. A pipe 45 is taken from the outlet 33 of this jacket to the inlet 24 of the framework 18, and a pipe 46 is taken from the outlet 25 of the frmework to the inlet 38 of the finned tubes associated with the gear box. The outlet 39 is connected by a pipe 47 to a heat-exchange device 48.

During operation of the power transmission water derived from a reservoir (not shown) and supplied under pressure by a pump (also not shown) to the inlet 40 passes through the valve 41, the pipe 42, the valve 43 and the pipe 44 to the inlet 32. After passing through the jacket 31 and affording cooling of the electric motor 11, the water passes through the outlet 33 and the pipe 45 to the inlet 24 of the framework 18 associated with the coupling 12. Some of the heat generated in the operation of the coupling passes by radiation to the fins 30 of the tube 20 and thus to the tube itself, being then conducted by the tube into the water flowing therethrough. This water is discharged to the exterior of the transmission through the outlet 25 and then passes through the pipe 46 to the common inlet 38 of the finned tubes 34 to 37.

After passing through the finned tubes, and thereby affording cooling of the gear box, the water is discharged through the outlet 39 and pipe 47 to the heat-exchange device 48 where it is cooled before passing to the reservoir for recirculation to the inlet 40 of the cooling circuit.

With reference now to FIGS. 5 and 6, instead of forming the framework associated with the fluid coupling 12 as a single tube, a framework 50 of copper tubing is provided which includes two ring members 51 and 52. This framework is adapted to be disposed in the annular space 19 of FIG. 1, the centres of the members 51 and 52 lying on the longitudinal axis of the fluid coupling.

The members 51 and 52 are axially spaced apart, and respectively have a water inlet 53 and a water outlet 54. A water inlet pipe 55 connects to the inlet 53 and a water outlet pipe 56 connects to the outlet 54, both pipes extending through suitable apertures in the guard member to the exterior thereof for connection, respectively, to the pipes 45 and 46 of FIG. 1.

The members 51 and 52 are connected together by a plurality of joining tubes 57, 58 which are brazed to them, these tubes being closely-spaced circumferentially of the ring members and their interiors opening into the interiors of the ring members. The joining tubes are of U-shape and so joined to the ring members that each projects radially-inwardly from one of the ring members for part of its length towards the fluid coupling and for the remainder of its length is directed away from the coupling to join with the other ring member. Alternate joining tubes 57 project further towards the fluid coupling than the other joining tubes 58.

Suitable attachment plates 59, 60 are provided for securing the framework 50 in position around the fluid coupling.

During operation of the power transmission, and with water passing through the cooling circuit, some of the heat generated in the fluid coupling passes by radiation to the copper tubing of the framework 50 and this heat is conducted by the tubing into the water flowing therethrough, being discharged to the exterior of the transmission in the water passing through the outlet 54 and pipe 56.

By so arranging for the alternate joining tubes 57 to project further towards the fluid coupling than the other joining tubes 58, that is, the joining tubes curving inwardly alternately to a greater and a lesser extend, the better is the interception by the joining tubes of the heated air in the annular space in which the framework is mounted.

In each of the above-described embodiments the framework of tubing provides an efficient means for dissipating some of the heat generated during operation of the fluid coupling and is intended to ensure that the coupling operating temperature is maintained below a predetermined value.

Instead of providing a framework of tubing in association with the fluid coupling, a jacket through which water may be caused to flow may be provided. The jacket may be comprised by the other surface of a housing within which the fluid coupling is contained, a flange at each end of the housing, fins which radiate outwardly of the outer surface and extend between the two flanges, and a cover plate or cover plates associated with the flanges and fins. Thus, a plurality of spaces will be provided about the fluid coupling through which cooling water can be passed.

The cover plates may comprise a number (equal to the number of fins) of angle-section members and a number of plate members. The free end portion of one of the limbs of an angle-section member will be joined to the outer edge of a fin, and the free end portion of the other limb will be joined to the outer surface of the housing. Thus, the other limb of an angle-section member forms an effective fin for the housing. The space then left between a fin and an effective fin will be closed by a plate member joined to the outer edges of a fin and an effective fin.

There may be a manifold at each end of the housing which contains the fluid coupling, which manifolds are common to all the closed spaces (for example, by holes in the flanges) and which are employed to supply cooling water to and remove cooling water from the closed spaces.

In another construction, the cooling water may be introduced into one of the closed spaces, may then flow around the outer surface of the housing by way of holes in the fins and, if any, effective fins, possibly following a tortuous path, and may be removed by way of another of the closed spaces.

Although in all the embodiments above-described the cooling liquid is water, in other embodiments other cooling liquids may with advantage be used.

In yet other embodiments the liquid, having flowed as described to the three components of the power transmission in the desired sequence, may than be used for another purpose, or, where the liquid supply is plentiful, it may be allowed to run to waste. Such flow to waste may be by way of a heater.

A power transmission in accordance with the invention enables a "fixed-fill" fluid coupling to be used which is of a lower power rating, and hence of smaller size, than would be otherwise possible, and so allows a more compact power transmission to be provided.

I claim:

1. A power transmission including a motor, a "fixed-fill" fluid coupling and a gear box, at least the fluid coupling of which is liquid-cooled, tubing being provided which is formed as a framework and which is so associated with the fluid coupling that cooling liquid caused to pass through the interior of the tubing is brought into heat-exchange relation with respect to said fluid coupling.

2. A transmission is claimed in claim 1, wherein siad framework of tubing comprises a single tube which is so shaped as to form at least two axially-spaced-apart portions which are substantially of ring-shape.

3. A transmission as claimed in claim 2, wherein one end portion of said tube forms a liquid inlet and the other end portion of the tube forms a liquid outlet, the tube being so shaped at a suitable portion or portions thereof as at least to assist in affording the axial spacing of said substantially ring-shaped portions.

4. A transmission as claimed in claim 3, wherein the external surface of the single tube carries cooling fins.

5. A transmission as claimed in claim 4, wherein said fins are spirally wound.

6. A transmission as claimed in claim 1, wherein said framework includes at least two ring members, formed of said tubing, whose centres substantially lie on the longitudinal axis of the fluid coupling.

7. A transmission is claimed in claim 6, wherein said ring members are axially-spaced-apart and connected together by a plurality of joining tubes.

8. A transmission as claimed in claim 7, wherein the joining tubes are closely-spaced circumferentially of the ring members, and their interiors open into the interiors of the ring members.

9. A transmission as claimed in claim 7, wherein said joining tubes are so shaped and so joined to said ring members that each joining tube projects inwardly from one of said ring members towards said fluid coupling for part of its length and for the remainder of its length is directed away from said coupling to join with the adjacent ring member.

10. A transmission as claimed in claim 7, wherein said joining tubes are curved in shaped and are substantially radially-disposed with respect to said longitudinal axis.

11. A transmission as claimed in claim 10, wherein alternate joining tubes project further towards said fluid coupling than the other joining tubes.

12. A transmission as claimed in claim 1, wherein a guard member is provided around the fluid coupling and spaced therefrom, said framework being disposed in the space formed between the guard member and the coupling.

13. A power transmission including a motor, a "fixed-fill" fluid coupling and a gear box, at least the fluid coupling of which is liquid-cooled, it being arranged for the cooling liquid to flow through a jacket, associated with the fluid coupling, which is comprised by the outer surface of a housing within which the coupling is contained, a flange at each end of the housing, fins which radiate outwardly of said outer surface and extend between the two flanges, and a cover plate or cover plates associated with the flanges and fins.

* * * * *